(12) United States Patent
Gondek et al.

(10) Patent No.: US 7,545,976 B2
(45) Date of Patent: Jun. 9, 2009

(54) METHOD AND APPARATUS FOR ASSOCIATING IMAGE ENHANCEMENT WITH COLOR

(75) Inventors: Jay Stephen Gondek, Camas, WA (US); Thomas Berge, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 10/137,001

(22) Filed: May 1, 2002

(65) Prior Publication Data

US 2007/0160285 A1   Jul. 12, 2007

(51) Int. Cl.
G06K 9/00 (2006.01)
G06K 9/40 (2006.01)
H04N 1/40 (2006.01)
H04N 1/46 (2006.01)
G09G 5/02 (2006.01)

(52) U.S. Cl. ............... 382/162; 382/254; 358/3.21; 358/517; 345/589

(58) Field of Classification Search ......... 382/162–167, 382/254–275; 358/3.21–3.27, 517–518; 345/589–606; 386/31
See application file for complete search history.

(56) References Cited

U.S. PATENT DOCUMENTS

| | | | | |
|---|---|---|---|---|
| 4,689,666 A | * | 8/1987 | Hatanaka | 348/624 |
| 5,428,377 A | * | 6/1995 | Stoffel et al. | 347/15 |
| 5,682,443 A | * | 10/1997 | Gouch et al. | 382/254 |
| 5,748,176 A | * | 5/1998 | Gondek | 345/600 |
| 5,754,186 A | * | 5/1998 | Tam et al. | 345/629 |
| 5,799,111 A | * | 8/1998 | Guissin | 382/254 |
| 5,850,471 A | * | 12/1998 | Brett | 382/162 |
| 5,854,859 A | * | 12/1998 | Sobol | 382/261 |
| 6,115,022 A | * | 9/2000 | Mayer et al. | 345/418 |
| 6,192,162 B1 | * | 2/2001 | Hamilton et al. | 382/266 |
| 6,642,931 B1 | * | 11/2003 | Haikin et al. | 345/601 |
| 6,665,448 B1 | * | 12/2003 | Maurer | 382/261 |
| 6,697,107 B1 | * | 2/2004 | Hamilton et al. | 348/234 |
| 7,057,776 B2 | * | 6/2006 | Akiyama | 358/462 |
| 7,092,573 B2 | * | 8/2006 | Luo et al. | 382/228 |
| 7,227,990 B2 | * | 6/2007 | Hirao | 382/167 |
| 2002/0093670 A1 | * | 7/2002 | Luo et al. | 358/1.9 |
| 2003/0179418 A1 | * | 9/2003 | Wengender et al. | 358/437 |
| 2004/0046802 A1 | * | 3/2004 | Wright et al. | 345/810 |

FOREIGN PATENT DOCUMENTS

| | | |
|---|---|---|
| EP | 0583127 | 1/1998 |
| JP | 2000196901 A | 12/1998 |
| JP | 2000-277206 | 3/2002 |
| WO | WO 99/22337 | * 5/1999 |

* cited by examiner

*Primary Examiner*—Daniel G Mariam
*Assistant Examiner*—Manav Seth

(57) ABSTRACT

Provided is a method and apparatus of processing an image using filters. The method and apparatus receives an input pixel and a pixel array associated with the image, identifies a color of the pixel array to facilitate processing the input pixel and the pixel array associated with the image and locates the color and the association with a corresponding image enhancement operation in a color lookup table.

20 Claims, 7 Drawing Sheets

| Color Groups | B | G | R | Type 1 Enhancement | Type 2 Enhancement | Type 3 Enhancement | Enhance Filter Index |
|---|---|---|---|---|---|---|---|
| Color Type 1 | $X_m$ | $Y_m$ | $Z_m$ | | x | | 0.00 |
| | $X_{m+1}$ | $Y_{m+1}$ | $Z_{m+1}$ | | x | | • |
| | $X_{m+2}$ | $Y_{m+2}$ | $Z_{m+2}$ | | x | | • |
| | $X_{m+3}$ | $Y_{m+3}$ | $Z_{m+3}$ | | x | | • |
| Color Type 2 | | • | | | x | | • |
| | | • | | | x | | • |
| | | • | | | x | | • |
| | | • | | | x | | 0.50 |
| Color Type 3 | | • | | x | | | • |
| | | • | | x | | | • |
| | | • | | x | | | • |
| | | • | | x | | | • |
| Color Type 4 | $X_{n-3}$ | $Y_{n-3}$ | $Z_{n-3}$ | | | x | • |
| | $X_{n-2}$ | $Y_{n-2}$ | $Z_{n-2}$ | | | x | • |
| | $X_{n-1}$ | $Y_{n-1}$ | $Z_{n-1}$ | | | x | • |
| | $X_n$ | $Y_n$ | $Z_n$ | | | x | 1.00 |

| Color Groups | B | G | R | Sharpen Enhancement | Smooth Enhancement | Neutral Enhancement | Enhance Filter Index |
|---|---|---|---|---|---|---|---|
| Dark Colors | $X_m$ | $Y_m$ | $Z_m$ | | x | | 0.00 |
| | $X_{m+1}$ | $Y_{m+1}$ | $Z_{m+1}$ | | x | | • |
| | $X_{m+2}$ | $Y_{m+2}$ | $Z_{m+2}$ | | x | | • |
| | $X_{m+3}$ | $Y_{m+3}$ | $Z_{m+3}$ | | x | | • |
| Flesh Tones | | • | | | x | | • |
| | | • | | | x | | • |
| | | • | | | x | | • |
| | | • | | | x | | 0.50 |
| Green Colors | | • | | x | | | • |
| | | • | | x | | | • |
| | | • | | x | | | • |
| | | • | | x | | | • |
| Light Colors | $X_{n-3}$ | $Y_{n-3}$ | $Z_{n-3}$ | | | x | • |
| | $X_{n-2}$ | $Y_{n-2}$ | $Z_{n-2}$ | | | x | • |
| | $X_{n-1}$ | $Y_{n-1}$ | $Z_{n-1}$ | | | x | • |
| | $X_n$ | $Y_n$ | $Z_n$ | | | x | 1.00 |

FIG. 5

METHOD AND APPARATUS FOR ASSOCIATING IMAGE ENHANCEMENT WITH COLOR

CROSS REFERENCE TO RELATED APPLICATIONS

This application relates to U.S. patent application Ser. No. 10/136,958 filed May 1, 2002 entitled "Parameterized Sharpening and Smoothing Method and Apparatus" filed on the same day therewith, assigned to the assignee of the present invention and incorporated by reference herein for all purposes.

BACKGROUND OF THE INVENTION

The proliferation of digital image photography, printing and image generation demands improved image processing techniques. These image processing techniques improve the perceived quality of images by manipulating the data captured and recorded by cameras and other devices. Lower cost devices can produce higher quality images through sophisticated image processing techniques performed on computers and peripheral devices. This satisfies the consumer's need for better quality images without spending large amounts of money for professional or even "prosumer" type devices.

One image processing technique called image-sharpening tends to increase the perceptibility of details in an image. Typically, image-sharpening operates by increasing pixel contrast on and around perceived edges in an image. If the edges are important to the image, this increases the visible details in the image and overall perceived quality of the image. Unfortunately, artifacts, noise and other details may not be desired yet will also be enhanced by image-sharpening operations. These sharpening operations can often make the image look "noisy" and appear of lower quality than if otherwise left alone.

Alternative image processing operations for smoothing operate to reduce or eliminate artifacts, noise and other undesired detailed elements of an image. Filters and other operations are applied to these images to soften or eliminate details perceived to be artifacts and noise. Smoothing preferably eliminates unwanted noise and artifacts by making neighboring pixels more consistent with each other. Applied indiscriminately, however, these smoothing filters have the deleterious effect of also eliminating desired details important to the image and can result in fuzzy or blurred images.

Active suppression of noise and artifacts during image processing is another method of improving image quality through image processing. These operations also have a smoothing effect primarily on or around sharp edges in an image. While these suppression methods may be more accurate, they can be computationally inefficient and therefore not cost effective to implement on lower cost hardware and software platforms.

Moreover, even high quality image processing methods cannot be applied successfully to all types of images. An image processing method that improves one image may be inappropriate when applied to another image. Further, one image processing technique may counteract the advantageous effects of another image processing technique.

BRIEF DESCRIPTION OF THE DRAWINGS

FIG. 4 is an exemplary table diagram providing the information stored in a spatial CLUT in accordance with an implementation of the present invention;

FIG. 5 is an example spatial CLUT designed in accordance with an implementation of the present invention and used for enhancing a specific set of colors;

DETAILED DESCRIPTION

Figure 1:
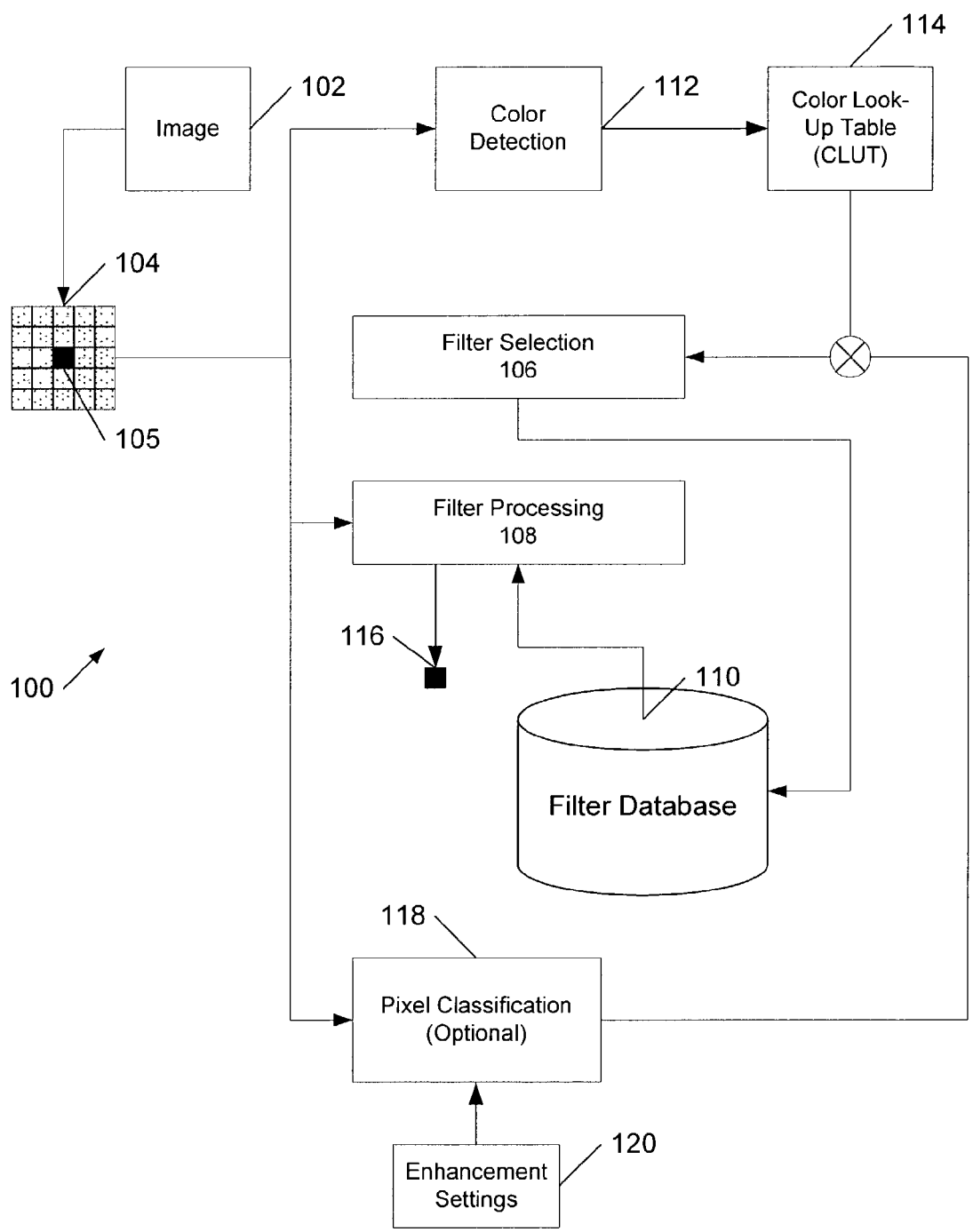
FIG. 1 is a block diagram illustrating an overall method and system of processing images in accordance with one implementation of present invention.

FIG. 1 is a block diagram illustrating an overall method and system 100 of processing images in accordance with one implementation of present invention. Processing image 102 involves a pixel window 104, an input pixel 105, a filter selection module 106, a filter processing module 108, a filter database 110, a color detection module 112, a color lookup table 114, an output pixel 116 and optionally a pixel classification module 118 with enhancement settings 120.

In one implementation, image 102 is processed in sections using pixel window 104 having N×N pixels. Alternate implementations may use an asymmetric pixel window having M×N pixels. In the case of an N×N pixel window 104 dimensions can be set to 5×5, 3×3 and other window dimensions depending on the granularity of processing required. Filter selection module 106 receives an indication from color lookup table 114 identifying a filter for processing input pixel 105 and pixel window 104. This indication can be an index or offset identifying a filter in filter database 110 or can be an actual image processing algorithm or set of parameters for performing an algorithm. In one implementation, filter processing module 108 applies the filter selected from filter database 110 to input pixel 105 and pixel window 104. Filter database 110 includes a wide range of filters and convolutions for image enhancement. For example, these filters and convolutions provide multiple levels of smoothing and sharpening operations for application on input pixel 105 and pixel window 104.

Optionally, filter selection module 106 receives indication from color lookup table 114 in weighted combination with an indication from pixel classification module 118 when selecting a filter from filter database 110 for processing an image. A user or application can further control the filter indication provided by pixel classification module 118 through adjustments to enhancement settings 120. Enhancement settings 120 allow a user or application to influence the indication provided by pixel classification module 118 to filter selection module 106 when making a filter selection.

For example, pixel classification 118 can provide an indication to use sharpening-type filters on input pixel 105 and the pixel window 104 having edges and smoothing-type filters for input pixel 105 and the pixel window 104 containing noise, blocking artifacts and other undesirable characteristics. These indications from pixel classification 118 are combined with sharpening or smoothing filter selection indications from color lookup table 114 to select the proper filter database 110. Because the pixel classification and filtering indicators are parameterized using enhancement settings 120, the sharpening and smoothing type image enhancements can be set according to the output image desired. Details on performing pixel classification and image enhancement using enhancement settings 120 in accordance with pixel classification module 118 is described in further detail in the U.S. patent application Ser. No. 10/136,958 entitled, "Parameterized Smoothing and Sharpening Method and Apparatus", assigned to the assignee of the present invention, filed on the same day therewith and incorporated by reference in the entirety for all purposes.

Representing images with the proper color models is an important aspect of the present invention. Because combining three primary colors (X, Y, Z) can define the light sensations a person experiences with their eyes, several tristimulus color spaces exist for specifying three independent functions of wavelength for the ideal trichromatic observer. The fundamentals of such three-dimensional constructs are described by the international standards body Commission Internationale L'Eclairage or CIE. Setting the standards for colorimetry and identifying colors is discussed in Principles of Color Technology, by Billmeyer and Saltzman, published by John Wiley & Sons, Inc., NY, copyright 1981 (2d. ed.) and Color Science: Concepts and Methods, Quantitative Data and Formulae, by Wyszecki and Stiles, published by John Wiley & Sons, Inc., copyright 1982 (2d ed.), incorporated herein by reference in pertinent parts, particularly pages 119-130 and Fundamentals of Interactive Computer Graphics, by Foley and Van Dam, Addison-Wesley Publishing Company, incorporated herein by reference in pertinent parts, particularly pages 606-621.

These various trichromatic model systems include: the red, green, blue (RGB) model; the cyan, magenta, yellow (and black) (CMY(K)) model; the hue, saturation, value (HSV) model; the hue, lightness, saturation (HLS) model; the luminance, red-green scale, yellow-blue scale (L*a*b*) model; and the YIQ model used in commercial color television broadcasting. Selecting the proper model depends on the application and the various advantages the model provides.

Typically, color input and output devices like scanners, cathode ray tube (CRT) video monitors, and printers present color images in a device-dependent fashion. For example, CRT guns are driven by voltage levels or other input signal functions that correspond to red, green and blue or RGB data triplets. These RGB data triplets correspond to the specific color gamut for the CRT and the unique colors produced by the CRT pixels on its screen. Differences in color reproduction on each of the devices means that the same RGB triplet may actually produce a very different color or hue when displayed on a different model CRT or hard copy made with a color printer using a different device color space like cyan, magenta, yellow and black or CMYK. (To maintain black color purity in CMYK printing, a separate black (K) ink or toner may be provided rather than printing all three cyan, magenta and yellow colors to form a composite black).

Transforming colors between devices or color spaces on different devices requires complex, non-linear computations in multiple dimensions. To reduce the processing requirements for these transformations, the correlative values are typically precomputed and stored in large color look-up tables (CLUT) sometimes requiring upwards of 50 Mb or more. Generally, a larger CLUT contains a wider range of color combinations yielding more accurate color images, but may require more computing time or processing power as the CLUT is searched and accessed. Further compute time and processing power is also required when a match between a color combination cannot be found in the CLUT, and thus complex interpolation within the color space is required in order to transform the color. Efficiently interpolating between values in large CLUTs is described in U.S. Pat. No. 5,748,176 entitled, "Multi-Variable Colorimeter Data Access by Iterative Interpolation and Subdivision", by Jay S. Gondek, assigned to the assignee of the present invention and incorporated by reference herein in the entirety.

Often, the CLUT contains data to approximate a transformation from an RGB system to a CMYK system facilitating the correlation between two color models and/or rendering of color images on different devices. These transformations often include the conversion of images rendered using the additive primary colors of red, green, and blue (RGB) for a computer video monitor into the subtractive primary colors, cyan, magenta, yellow and black (CMYK) for printing on a color printing device.

Figure 2:
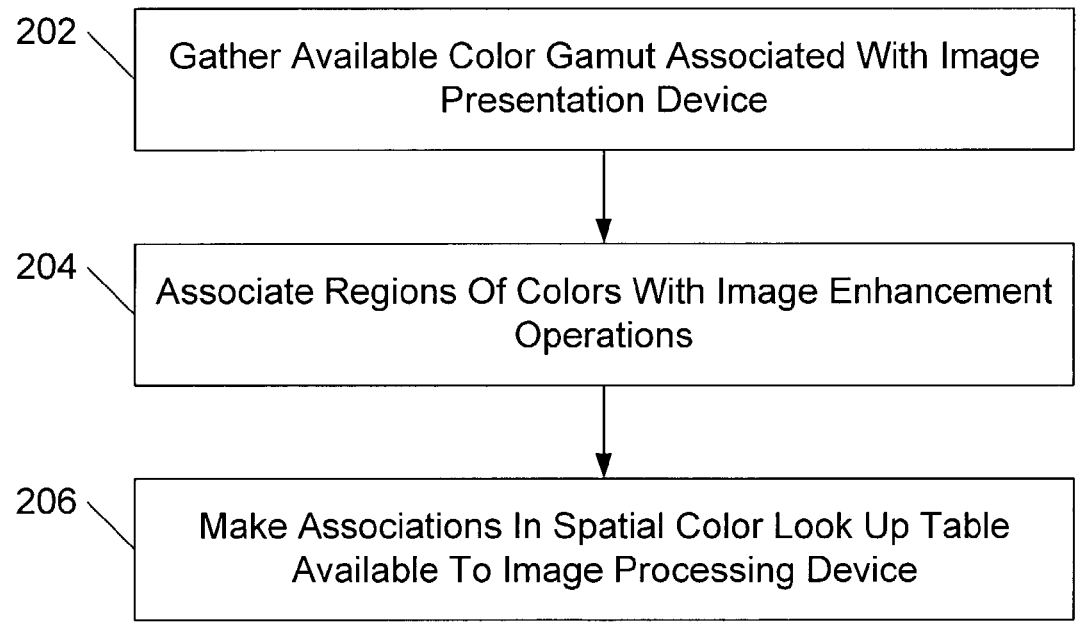
FIG. 2 is a flowchart diagram providing the operations associated with creating entries in a spatial CLUT as used by an image processing system designed in accordance with implementations of the present invention.

According to the present invention, CLUTs developed for each device are modified and used by implementations of the present invention to perform image processing, instead of color transformations. FIG. 2 is a flowchart diagram providing the operations associated with creating these entries in the CLUT as used by an image processing system designed in accordance with implementations of the present invention.

Initially, a color gamut is gathered for an image presentation device. The color gamut has the range of available colors the device is capable of reproducing (202). As described above, the trichromatic model used to represent the color gamut depends on the type of device and method the device uses to produce color images. Color printers using the CYMK color model have a corresponding color gamut representing the effect of combining each of the cyan, yellow and magenta colors together in various combinations and amounts. Similarly, color CRT display devices using the RGB color model have a color gamut describing the effect of combining each of the red, green and blue colors together on the display device.

Representing the displayable colors for these and other raster devices is a subset of the total color space represented by the CIE chromaticity diagrams. Rather than CIE chromaticity diagrams, RGB space or CYMK space is generally represented using a Cartesian coordinate system with the additive RGB or subtractive CYMK primaries along opposing ends of the X, Y and Z axis. Of course, other color model representations are also possible and aspects of the present invention are not limited to only RGB and CYMK color models. This Cartesian coordinate system is used by U.S. Pat. No. 5,748,176 entitled, "Multi-Variable Colorimeter Data Access by Iterative Interpolation and Subdivision" to efficiently interpolate between entries in the CLUT and effectively improve the dynamic range without significant hardware or other algorithmic operations.

Once the color gamut is determined for a device, different regions of colors representing the color gamut in a spatial CLUT are associated with one or more image enhancement operations (204). Entries in the spatial CLUT can utilize an index or an embedded database query to access the enhancements operations in a separate database. Alternatively, the spatial CLUT may have enough room to directly store appropriate algorithm operations and/or convolutions for enhancing the images.

In accordance with the present invention, color schemes frequently found in images are improved through the application of certain enhancement or image processing operations. The spatial CLUT cross references the various color schemes with the specific enhancement operations thereby facilitating the image enhancement process. By referencing segments of the image by color, typical objects or scenes in the image receive the most appropriate type of image enhancement. Conversely, other portions of the image having other color schemes are not processed by inappropriate image enhancement operations.

For example, in one implementation shades of green are associated in the spatial CLUT with sharpening routines. Leaves, grasses, trees, foliage and other similar objects typically associated with shades of green are sharpened thereby enhancing the perception of these objects in the image. Similarly, flesh tone colors are associated in the spatial CLUT with smoothing routines thus reducing artifacts, noise and other undesirable elements that sometimes appear on the skin tones of people appearing in images. Moreover, segmenting these regions of colors in accordance with the present invention reduces the degree that flesh tone colors in a photo incorrectly receive sharpening, or shades of green in a photo are inadvertently smoothed. Other color regions in the spatial CLUT can also be associated with smoothing, sharpening or any other enhancement operations closely associated with a region of colors or spectrum of colors in a logical grouping.

The spatial CLUT is made available to image processing devices once enhancement operations are associated with entries in the spatial CLUT (206). Image processing devices include display card devices or other image processing equipment used to render images on computers or computer-based equipment. The actual spatial CLUT is made available using application programming interfaces (API), system calls and other interfaces typically used to interface traditional CLUTs used for color transformations rather than spatial transformations. For example, the spatial CLUT can be provided directly in an operating system or within device-drivers designed to interface between the operating system and image processing devices associated with a computer or computer-based device.

Figure 3:
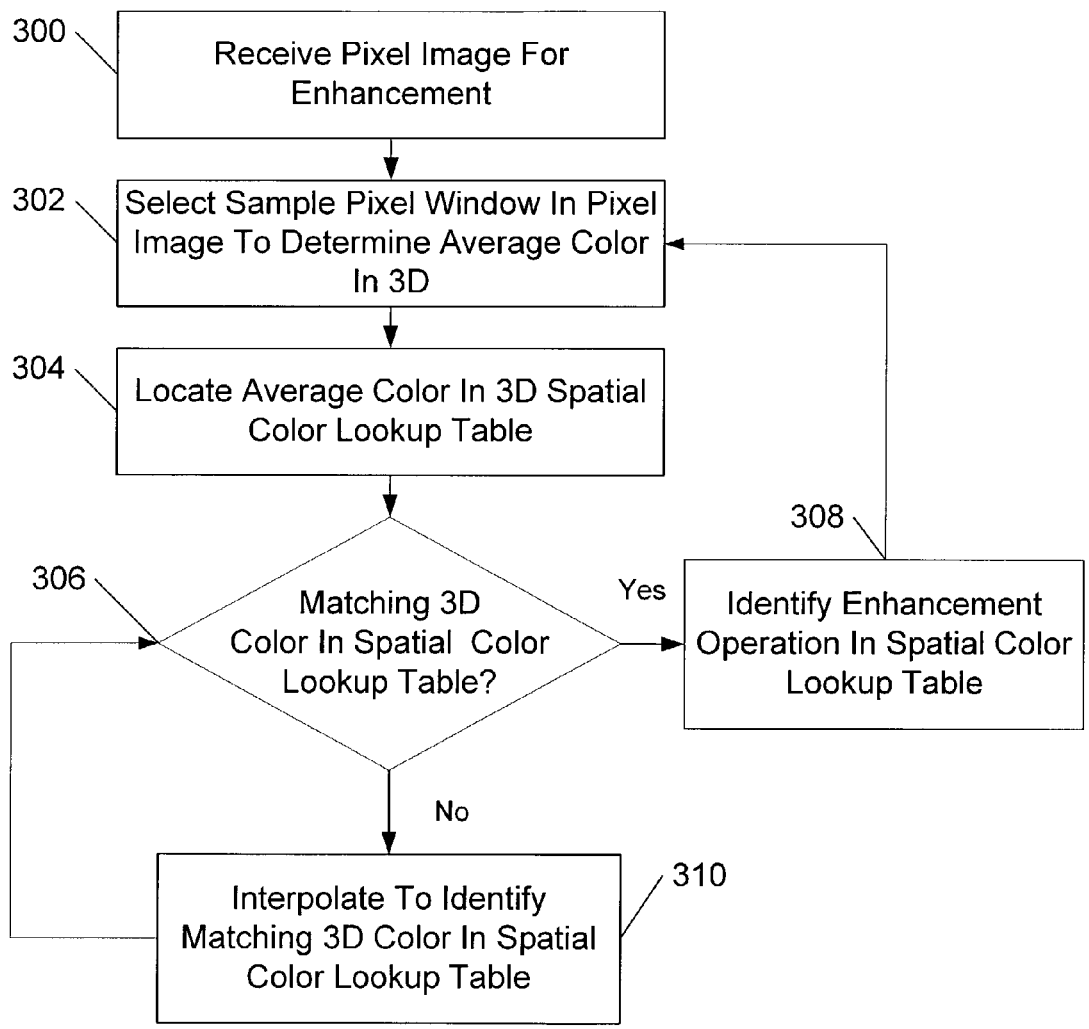
FIG. 3 is a flowchart diagram illustrating the operations associated with using a spatial CLUT to enhance certain color groupings in an image according to an implementation of the present invention.

FIG. 3 is a diagram illustrating the operations associated with using a spatial CLUT to enhance certain color groupings in an image. Initially, the enhancement operation receives a pixel image for enhancement (300).

A sample pixel window and input pixel in the pixel image is selected for determining an input color and the corresponding enhancement operation (302). In one implementation, the input pixel is in the center of a pixel window having either a 5×5 dimension, a smaller 3×3 dimension or another dimension. Using a smaller pixel window allows the processing to occur more rapidly while the large pixel dimension trades the longer processing times for more precision. Each resulting enhancement operation modifies the input pixel and pixel window before shifting the sample pixel window to cover another area of the image. Continuing this enhancement operation on the input image creates an enhanced output image of the same dimensions in accordance with the present invention.

The input color of the pixel window is generally determined by taking a center weighted average of the values in the pixel window. Alternatively, the input color can be determined by using a weighted average of the values in the pixel window without the extra emphasis on the color contributed by the input pixel in the center of the pixel window. A further alternative can use the input color associated with the input pixel in the center of the pixel window rather than performing any color determination calculations.

The input color identified is cross referenced in the spatial CLUT to locate an appropriate enhancement operation (304).

Identifying the input color in the spatial CLUT involves comparing the input color with entries in the spatial CLUT using the appropriate color model. In some cases, it may be necessary to convert the input color into a color model compatible with entries in the spatial CLUT (i.e., RGB to CYMK or CYMK to RGB).

The larger the spatial CLUT, the higher the likelihood that the specific color combination associated with the input color will be immediately identified in the spatial CLUT. In some cases, however, the input color does not match an entry in the spatial CLUT even when using the same 3 D color space (306). To identify the closest matching entry in the spatial CLUT, entries in the spatial CLUT are interpolated until a match with the input color is located. Efficient interpolation of entries in a CLUT is further described in U.S. Pat. No. 5,748,176 entitled, "Multi-Variable Colorimeter Data Access by Iterative Interpolation and Subdivision". Several iterations of interpolation (310) and matching (306) of the input color with entries in the spatial CLUT may occur until a match is found.

In one implementation, the matching entry in spatial CLUT is accessed and the corresponding enhancement operation is identified (308). This enhancement operation is obtained from filter database 110 and provided to filter selection 106 and filter processing 108 in FIG. 1 and used to enhance input pixel 105 and pixel window 104. Alternatively, the enhancement operation identified the spatial CLUT is used in combination with other factors for determining which filters from filter database 110 to apply. For example, these factors could include a local gradient and mean absolute deviation associated with the input pixel and pixel window. A pixel classification method and apparatus described in U.S. patent application Ser. No. 10/136,958 entitled, "Parameterized Smoothing and Sharpening Method and Apparatus" provides additional factors for selecting smoothing and sharpening enhancement filters using local gradient and mean absolute deviation calculations as previously described.

FIG. 4 is an exemplary table diagram providing the information stored in a spatial CLUT 400 in accordance with the present invention. Accordingly, spatial CLUT 400 includes color groups 402, 3 D color space identifiers 404, type 1 enhancement identifier 406, type 2 enhancement identifier 408 and type 3 enhancement identifier 410. An enhancement filter index 412 is included to identify a range of filter types along a continuum. For example, one implementation of spatial CLUT 400 uses enhancement filter index 412 of 0.0 to indicate a maximum smoothing enhancement, an enhancement filter index of 0.5 to indicate a no smoothing or sharpening and 1.0 to indicate application of a maximum sharpening operation on an input pixel and corresponding pixel window.

This particular table divides the color gamut for an image processing device into four different groups. Alternate implementations of the present invention could divide the color gamut into greater or fewer groups of colors. Each color grouping is associated with one or more different enhancement filters. For example, Color type 1 is associated with 3 D color space identifiers ranging from $X_m, Y_m, Z_m$ to $X_{m+3}, Y_{m+3}, Z_{m+3}$. In this example, the entries in color type 1 are all associated with the same Type 2 enhancement. This Type 2 enhancement could be a sharpening enhancement, a smoothing enhancement or any other type of enhancement to perform on input pixel and the associated pixel window. Colors identified as Color Type 2, Color Type 3 and Color Type 4 operate in a similar manner with respect to entries in the table diagram of FIG. 4.

Spatial CLUT 500 designed in accordance with the present invention is provide in FIG. 5 and correlates sharpening and smoothing type convolution filters with one or more different colors. In spatial CLUT 500 color groups 502 include dark colors, flesh tones, green colors and light colors. These colors in color groups 502 are associated respectively with 3 D color space identifiers 504 as illustrated in FIG. 5. Although these 3 D color space identifiers 504 appear in sequence, alternate implementations can also use color space entries that are out of sequence, follow different mathematical patterns or randomly entered into spatial CLUT 500.

In this example, dark colors and flesh tones from color groups 502 are associated with smooth enhancement operations 508. This is done to reduce the higher sensor noise typically found in the darker colors of images and, in the case of flesh tones, to reduce noise, artifacts and even blemishes sometimes found on the skin of people in images. In comparison, green colors in color group 502 are associated with sharpen enhancement 506 to increase the detail associated with portions of an image having shades of green. This is useful for bringing out the details of trees and other foliage and generally enhances an image. Separating the colors and enhancement operations in this manner keeps foliage and high-frequency detail portions of an image crisp and clear while not inadvertently sharpening artifacts and noise sometimes associated with people's faces and other areas with skin tone colors. As illustrated in FIG. 5, a neutral enhancement operation 510 is associated with and applied to light colors. Like the spatial CLUT in FIG. 4, the enhancement filter index 512 of 0.0 indicates a maximum smoothing enhancement, the enhancement filter index of 0.5 to indicate a no smoothing or sharpening and 1.0 to indicate application of a maximum sharpening operation on an input pixel and corresponding pixel window.

Figure 6:
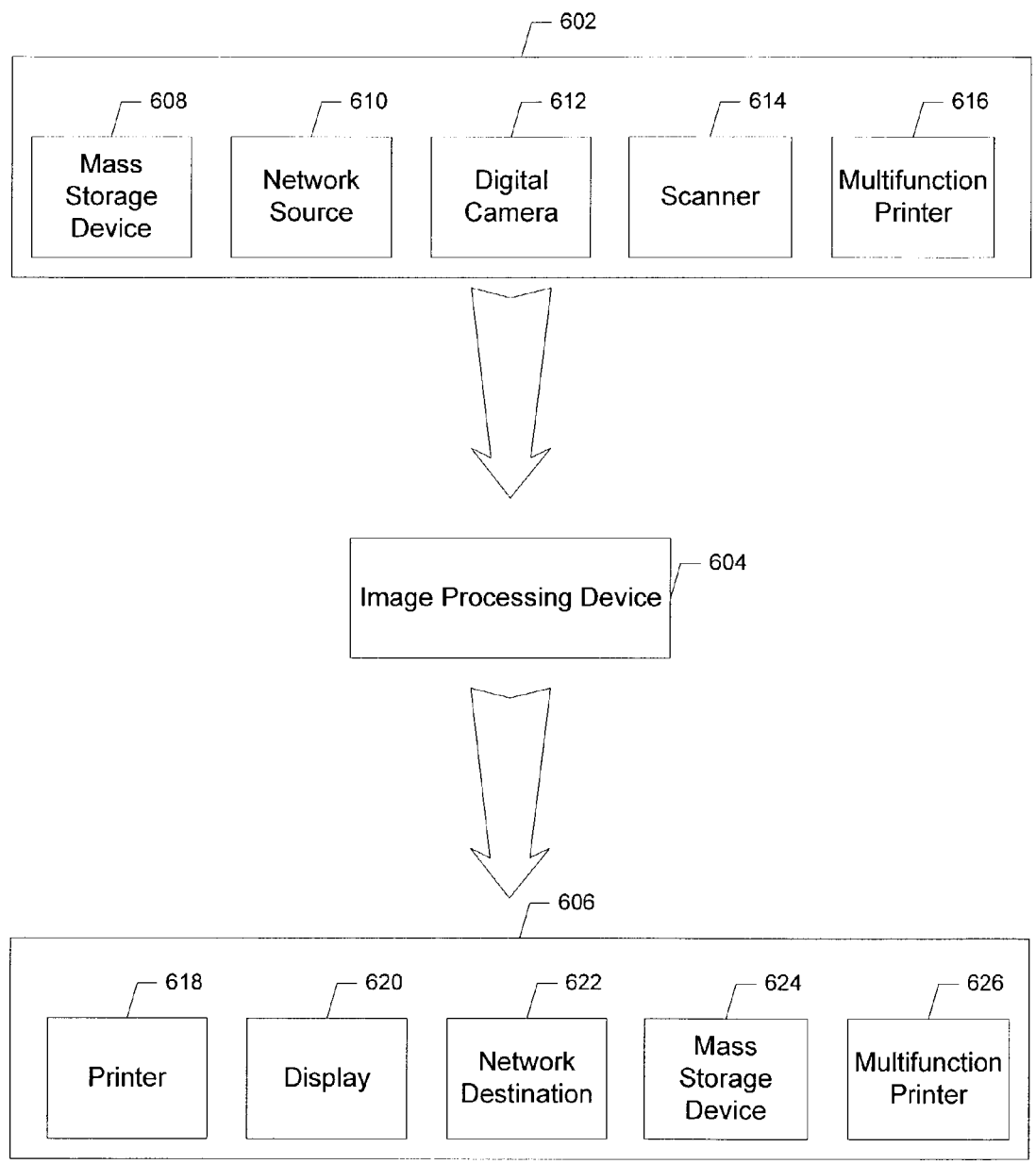
FIG. 6 is a block diagram representing the types of devices capable of using an image processing device and enhanced images designed in accordance with an implementation of the present invention.

FIG. 6 is a block diagram representing the types of devices capable of using an image processing device 604 designed in accordance with the present invention. In this example, image source devices 602 include a mass storage device 608, network source 610, digital camera 612, scanner 614 and multifunction printer 616. These image source devices 602 either generate images or provide stored images to image processing device 604 for processing and enhancement in accordance with the present invention. Image destination devices 606 include printer 618, display 620, network destination 622, mass storage device 624 and multifunction printer 626. These image destination devices 604 receive an image enhanced in accordance with the present invention using a spatial CLUT and, optionally, other types of enhancement selection operators. While not illustrated, a computer operating to provide one or more of the functionalities associated with image source devices 602 and image destination devices 604 can operate as one or more image source devices 602, one or more image destination devices 604 or a combination of both.

Figure 7:
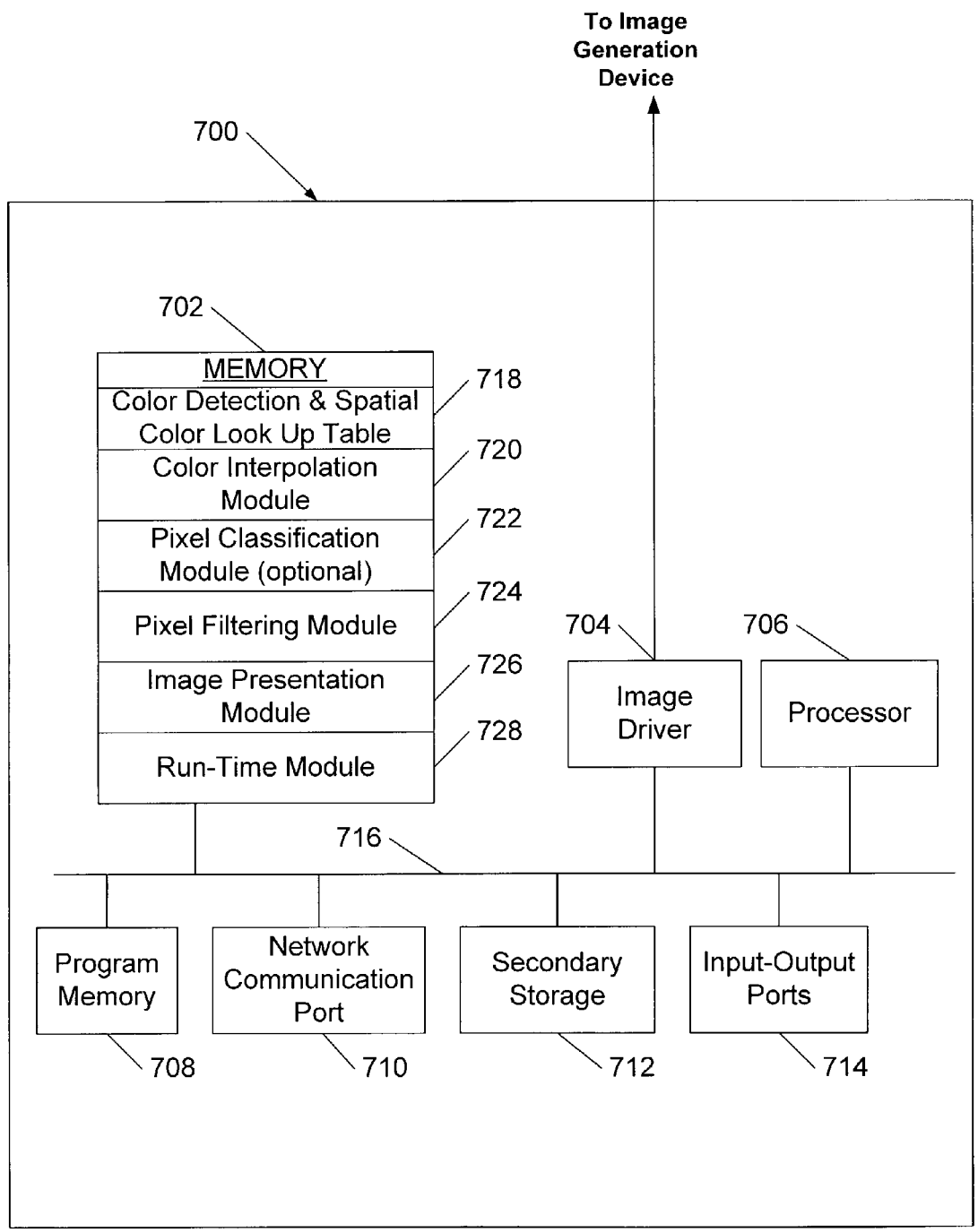
FIG. 7 is a block diagram representation of an image processing apparatus for image processing in accordance with one implementation of the present invention. Like reference numbers and designations in the various drawings indicate like elements.

FIG. 7 is a block diagram representation of an image processing apparatus 700 for image processing in accordance with one implementation of the present invention. In this example, image processing apparatus 700 includes a primary memory 702, an image driver 704, a processor 706, a program memory 708, a network communication port 710, a secondary storage 712, and input-output ports 714.

Image processing apparatus 700 can included as part of a computer system or can be designed into one or more different types of peripheral equipment. In a computer system, image processing apparatus 700 receives graphics from an application and enhances the images in accordance with the present invention. Software and controls used by image processing apparatus 700 may reside in the application, in device drivers, in the operating system or a combination of these areas depending on the implementation design requirements. Alternatively, if image processing apparatus 700 is part of a peripheral device like a printer or display, images could be enhanced without depending entirely on the processing requirements of a computer. This would enable, for example, a stand alone network attached image generation device to process and enhance image in accordance with the present invention without relying on the concurrent availability of a personal computer or similar computing device. For example, a network attached printer device could receive images over a network and process the images in accordance with the present invention. Implementations of the present invention could be installed or built into a single network attached peripheral device providing enhanced images without requiring upgrade of applications, operating system or computer devices throughout the network.

Primary memory 702 stores and retrieves several modules for execution and access under the control of processor 706. These modules include: a color detection and spatial CLUT 718, a color interpolation module 720, a pixel classification module (optional) 722, a pixel filtering module 724, an image presentation module 726 and a runtime module 728.

Color detection and spatial CLUT 718 receives an input pixel and pixel window for processing. Colors are detected and cross referenced to entries in the spatial CLUT to access enhancement operations or associations with enhancement operations. In one implementation, enhancement operations or algorithms are stored in a storage area within color detection and spatial CLUT 718. Alternatively, the entries in color detection and spatial CLUT 718 identifies enhancement operations stored elsewhere and these entries are used to influence or select the actual enhancement operations using different access methodologies.

Color interpolation module 720 can be invoked to identify the proper entry in the spatial CLUT for a particular input color. As described previously, some input colors cannot be matched with entries in the spatial CLUT; interpolating between existing entries in the spatial CLUT determines a viable alternative. In one embodiment, the interpolation method for selecting the entry in spatial CLUT is designed in accordance with U.S. Pat. No. 5,748,176 entitled "Multi-variable colorimetric data access by iterative interpolation and subdivision".

Pixel classification module 722 is an optional module used in conjunction with spatial CLUT to identify a suitable enhancement operation for enhancing a portion or all of an image. For example, pixel classification module 722 can use gradient and mean average deviation calculations to classify pixels for sharpening and smoothing. Combining these determinations with interpolations and selections from entries in spatial CLUT may modify these filter enhancement selections and provide sharper green foliage and smoother skin tones in an image.

Pixel filtering module 724 applies the selected filters to the pixel or pixels from an image. The resulting pixels passing through pixel filtering module 724 are enhanced using enhancement operations in accordance with one implementation of the present invention. Image presentation module 726 sends a block or stream of image data over bus 716 including the enhanced pixels and onto image generation device for display, printing or other visual representation. Additional functions in image presentation module may include data buffering, compression, encryption and other image processing operations. Run-time module 728 can be a real-time executive or operating system or conventional preemptive operating system that coordinates the allocation of resources, operation and processing on image processing device 700.

Image driver 704 interfaces with one or more different types of image generation devices providing signal and protocol level communication suitable for communication with the particular device.

Processor 706 can be a general purpose processor that executes x86 instructions or similar general purpose instructions. Alternatively, processor 706 can be an embedded processor that executes instructions burned into ROM or microcode depending on the implementation requirements.

Program memory 708 provides additional memory for storing or processing instructions used by processor 706. This area may operate as a primary area to execute instructions or as an additional cache area for storing frequently used instructions or macro-type routines.

Network communication port 710 provides network connectivity directly with image processing device 700. This port can provide high-speed network access using protocols like TCP/IP or can provide dial-up serial access over a modem link using serial network protocols like PPP, SLIP or similar types of communication for communication or diagnostics purposes.

Secondary storage 712 is suitable for storing executable computer programs, including programs embodying the present invention, and data used by the present invention. This area can be a traditional memory or solid-state memory storage.

Input/output (I/O) ports 714 are coupled to image processing device 700 through bus 716. Input/output ports 714 facilitate the receipt and transmission of data (e.g., text, images, videos, and animations) in analog or digital form over other types of communication links such as a serial link, local area network, wireless link, and parallel link. Input/output (I/O) ports 612 facilitate communication with a wide variety of peripheral devices including keyboards, pointing devices (mouse, touchpad and touchscreen) and printers. Alternatively, separate connections (separate buses) can be used to interface with these peripheral devices using a combination of Small Computer Systems Interface (SCSI), Universal Serial Bus (USB), IEEE 1394/Firewire, Personal Computer Memory Card International Association (PCMCIA) or any other suitable protocol.

In practice, the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of processing an image, comprising:
   receiving an input pixel and a pixel window associated with the image;
   identifying a visible color of the pixel window to facilitate processing the input pixel and the pixel window associated with the image;
   locating the color and the association with a corresponding image enhancement operation in a color lookup table;
   receiving a pixel classification associated with the input pixel and input pixel window based on the input pixel and input pixel window having at least one from a set of: an edge, noise, an artifact to be blocked, and a undesirable characteristic;
   selecting another image enhancement operation influenced by the pixel classification; and
   applying a filter to the input pixel based on the color lookup table, the image enhancement operation identified in the color lookup table, and the other image enhancement operation.

2. The method of claim 1, wherein the pixel window is according to a first color model and the color lookup table is according to a second color model, further comprising converting the colors in the pixel window from the first color model to the second color model.

3. The method of claim 1, wherein the image enhancement operation is identified by the color.

4. The method of claim 1, wherein the image enhancement operation is embedded within the color lookup table.

5. The method of claim 1 further comprising:
   performing the image enhancement operation identified in the color lookup table and associated with the color.

6. The method of claim 1, wherein the pixel window corresponds to a 3×3 window of pixel intensity values.

7. The method of claim 1, wherein the pixel window corresponds to a 5×5 window of pixel intensity values.

8. The method of claim 1, wherein the identified color is computed using a weighted average of colors in the input pixel window.

9. The method of claim 8, wherein the weighted average is a center weighted average.

10. The method of claim 1, wherein the identified color is computed using the color associated with the input pixel.

11. The method of claim 1, wherein locating the color in the color look up table further comprises: determining if the color identified matches an entry in the color look up table; using the entry in the color look up table directly when the determination indicates the color identified matches; and generating an interpolated entry in the color look up table when the determination indicates that the color identified does not directly match an entry in the look up table.

12. The method of claim 11, wherein the interpolation is performed using iterative interpolation and subdivision of a color map.

13. The method of claim 1, wherein the enhancement operation sharpens at least one pixel in the input pixel window.

14. The method of claim 13, wherein the sharpening enhancement operation is associated with colors classified as green in the color look up table.

15. The method of claim 1, wherein the enhancement operation smoothes at least one pixel in the input pixel window.

16. The method of claim 15, wherein the smoothing enhancement operation is associated with colors classified as flesh tones in the color look up table.

17. The method of claim 15, wherein the smoothing operation is associated with colors classified as dark in the color look up table.

18. The method of claim 13, wherein the sharpening operation is associated with colors classified as light in the color look up table.

19. The method of claim 1, wherein the pixel classification indicates a smoothing operation should be performed.

20. The method of claim 1, wherein the pixel classification indicates that a sharpening operation should be performed.

* * * * *